(12) United States Patent
Barde et al.

(10) Patent No.: US 11,853,271 B2
(45) Date of Patent: Dec. 26, 2023

(54) CREATING AN EXTENSIBLE AND SCALABLE DATA MAPPING AND MODELING EXPERIENCE

(71) Applicant: Salesforce, Inc., San Francisco, CA (US)

(72) Inventors: Kaustubh Barde, Union City, CA (US); Vineeth Anand Nair, Fremont, CA (US); Sarah Flamion, Newburgh, IN (US); Shengfan He, West New York, NJ (US); Narinder Singh, Medina, WA (US); Caroline Casey Logue, New York, NY (US); Bradley Carroll Wright, San Francisco, CA (US); Christopher Bill, Indianapolis, IN (US); Jason Day, Fortville, IN (US); Sumit Garg, Sammamish, WA (US); Chaitanya Pinnamaneni, Bellevue, WA (US)

(73) Assignee: Salesforce, Inc., San Francisco, CA (US)

( * ) Notice: Subject to any disclaimer, the term of this patent is extended or adjusted under 35 U.S.C. 154(b) by 210 days.

(21) Appl. No.: 16/804,185

(22) Filed: Feb. 28, 2020

(65) Prior Publication Data

US 2021/0149854 A1  May 20, 2021

Related U.S. Application Data

(60) Provisional application No. 62/937,199, filed on Nov. 18, 2019.

(51) Int. Cl.
*G06F 16/00* (2019.01)
*G06F 16/21* (2019.01)
(Continued)

(52) U.S. Cl.
CPC ........ *G06F 16/213* (2019.01); *G06F 16/2379* (2019.01); *H04L 63/08* (2013.01); *H04L 63/126* (2013.01)

(58) Field of Classification Search
None
See application file for complete search history.

(56) References Cited

U.S. PATENT DOCUMENTS 7,007,020 B1 * 2/2006 Chen .................. G06Q 30/0201
705/7.29
2007/0160067 A1 * 7/2007 Hayward .............. G06F 16/258
370/397

(Continued)

*Primary Examiner* — Anhtai V Tran
(74) *Attorney, Agent, or Firm* — Holland & Hart LLP

(57) ABSTRACT

Methods, systems, and devices are described that support extensible data mapping. A data mapping server may receive an indication of a source schema for a data source and may receive a user input indicating creation of a custom data object to handle the source schema. The server may create the custom data object based on the user input. The data mapping server may automatically map one or more data fields for a source data object (e.g., based on the source schema) to one or more custom data fields for the custom data object (e.g., based on a custom schema). The server may import a set of data records stored at the data source and may store the data records in a database system according to the custom schema based on the data mapping. The stored custom data objects may be used for segmentation, activation, analysis, or some combination thereof.

20 Claims, 10 Drawing Sheets

(51) Int. Cl.
 *H04L 9/40* (2022.01)
 *G06F 16/23* (2019.01)

(56) References Cited

U.S. PATENT DOCUMENTS

| | | | |
|---|---|---|---|
| 2008/0320012 A1* | 12/2008 | Loving | G06F 16/213 |
| 2014/0012886 A1* | 1/2014 | Downing | G06F 16/211 |
| | | | 707/805 |
| 2014/0129512 A1* | 5/2014 | Kawecki, III | G06F 16/2455 |
| | | | 707/607 |
| 2016/0217425 A1* | 7/2016 | Baird | G06F 16/245 |
| 2019/0377713 A1* | 12/2019 | Lankford | G06F 16/213 |
| 2020/0026532 A1 | 1/2020 | Bill et al. | |
| 2020/0143076 A1* | 5/2020 | Oberhofer | H04L 9/3239 |
| 2020/0349129 A1* | 11/2020 | Bracholdt | G06F 16/24578 |

* cited by examiner

CREATING AN EXTENSIBLE AND SCALABLE DATA MAPPING AND MODELING EXPERIENCE

CROSS REFERENCES

The present Application for Patent claims priority to U.S. Provisional Patent Application No. 62/937,199 by Barde et al., entitled "CREATING AN EXTENSIBLE AND SCALABLE DATA MAPPING AND MODELING EXPERIENCE," filed Nov. 18, 2019, which is assigned to the assignee hereof and expressly incorporated by reference herein.

FIELD OF TECHNOLOGY

The present disclosure relates generally to database systems and data processing, and more specifically to creating an extensible and scalable data mapping and modeling experience.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some systems maintain connections with separate data sources and fail to integrate the data sources into a single data model. In some examples, a user may be associated with one or more data sources which may increase the difficulty of resolving user identify, segmenting the data, acting on the data (e.g., sending an email based on the data), or determining insights based on the data. Some systems may additionally or alternatively fail to support different types of data models, such as standard data models, custom data models, or both. In some cases, implementing custom data models may require extensive knowledge related to the data, and standard data models may limit the functionally, flexibility, and/or benefits associated with data modeling.

DETAILED DESCRIPTION

Figure 1:
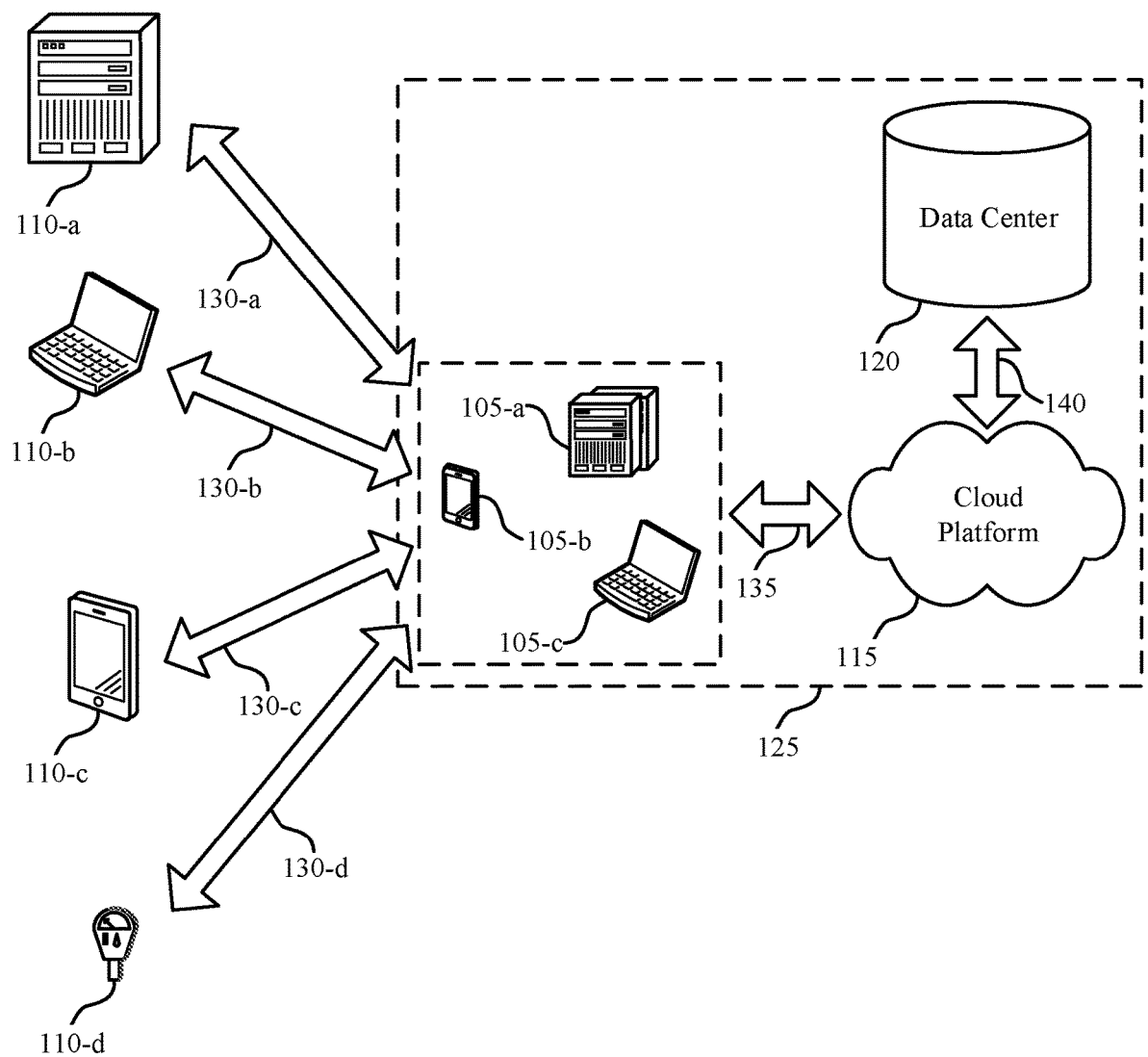
FIGS. 1 and 2 illustrate examples of systems for data mapping that support creating an extensible and scalable data mapping and modeling experience in accordance with aspects of the present disclosure.

In some systems (e.g., customer relationship management (CRM) systems or other data management systems), users or organizations may handle large volumes of data across different systems, applications, and sources. In some cases, these different sources may be siloed, such that managing data between the sources may be difficult (e.g., due to insufficient application programming interfaces (APIs), different data schemas, etc.). As such, systems may not support identifying correlations between user data in different data siloes (e.g., different data sources) or creating data models using data from multiple different data siloes. In some cases, the format of a data source may be static, but the way in which data from the data source is ingested may change over time. For example, a customer loyalty score may, at one time, be based on how frequently a customer shops for a particular brand and may, at another time, be based on how frequently a customer shops for a particular brand and how often the shopping is done in an online environment. These limitations may reduce the accuracy and effectiveness of data models that depend on the large volume of data from multiple data sources for a user or organization.

A system may implement an extensible and scalable data mapping and modeling experience to handle data across multiple different data sources (e.g., siloed data sources). The data mapping system may support the integration of multiple data sources into a cohesive data store (e.g., a data lake). In some examples, the data mapping system may support data mappings from source data objects to customizable target data objects. For example, the system may support personalization and customization by inheriting source schema details into data points (e.g., a data field, a data object, or a combination thereof), and the data points may be used in the target data objects. In some cases, the data mapping system may support custom data model objects, standard data model objects, custom data fields, standard data fields, or a combination thereof. Furthermore, the data mapping system may support connections between different data model objects. The system may support a user interface for users to view—and, in some cases, customize—the data mappings and other relationships between data objects.

Via the user interface, a user may manage data mappings. For example, the user may select the inputs for a data mapping procedure and may modify automated mappings from a source schema to a target schema (e.g., a data model schema supported at the data lake). The data mapping system may support mapping multiple different data object schemas from multiple different data sources into a shared custom schema. In some cases, the data mapping process may support identifying correlated user identities from different data sources and associating the correlated user information at rest in the data storage system. This reconciliation of user identities across independent, siloed data sources may support more accurate data models and user insights. Additionally, the data mapping process may preserve source data while supporting a data ingestion model that may evolve over time. For example, the data mapping system may store a first set of data source entities and a second set of data model entities (e.g., including the custom data objects). The data source entities may preserve the original data ingested from multiple data sources and the data model entities may support source-agnostic analytics (e.g., segmentation, activation, insights, etc.) based on the data mapping. That is, based on the extensible data mapping and modeling, the system may perform analytics across data retrieved from multiple siloed data sources, regardless of the source schemas. If the data mapping is updated (e.g., by a user in the user interface), the data mapping system may update the data model entities based on the preserved original data in the stored data source entities (e.g., without inefficiently re-ingesting any data from one or more data sources).

Aspects of the disclosure are initially described in the context of an environment supporting an on-demand database service. Additional aspects of the disclosure are described with respect to systems for data mapping and user interfaces supporting data mapping and modeling. Aspects of the disclosure are further illustrated by and described with reference to apparatus diagrams, system diagrams, and flowcharts that relate to creating an extensible and scalable data mapping and modeling experience.

FIG. 1 illustrates an example of a system 100 for data mapping that supports creating an extensible and scalable data mapping and modeling experience in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

System 100 may support users (e.g., cloud clients 105) connecting an organization's user data (e.g., data related to contacts 110) in a single place (e.g., a shared data lake) to drive identity resolution, data segmentation, activation, and insights. For example, a user may authorize a data source of interest (e.g., an external database, third-party data, etc.) and import the data from the data source based on the object schema for the data source (e.g., based on the data fields defined for the source data object). The system 100 may map these data fields into a data model. The data model may be a fully extensible schema structure with two types of objects: standard data model objects and custom data model objects. The standard data model objects may include predefined (or otherwise published for general use) data objects, fields, relationships, etc. In some cases, a user may add custom fields to these standard data model objects. The user can define the custom data model objects with custom fields (e.g., via a declarative data mapping user interface, as described with reference to FIGS. 3 through 5). This system 100 may allow a user to easily customize the data mapping platform based on existing source schemas to handle multiple different data sources and data models.

Some other systems may support multiple data sources but fail to integrate the data sources into a cohesive, organized, or well-defined data model (e.g., a data lake). For example, a user may be associated with one or more data sources which may increase the difficulty of resolving user identify (e.g., resolving the identify across data sources), segmenting the data, acting on the data (e.g., sending an email based on the data), or determining insights based on the data. Some systems may additionally or alternatively fail to support custom or standard data models. For example, some systems may support only standard data models while other system may support only custom data models. In some cases, custom data models require extensive knowledge related to the data, and standard data models may limit the functionally and/or benefits associated with the data. Furthermore, some systems may fail to preserve source data. For example, some systems may remove (e.g., delete from memory) source data that is not mapped to a data model during ingestion. In an additional or alternative example, some systems may not support the updating or altering of source data, reducing the usefulness or interpretability of source data.

In contrast, system 100 may support multiple data sources and integrate the data sources into a cohesive, organized, or well-defined data model (e.g., a data lake). For example, system 100 may provide a data model with an extensible schema structure and scalable data mapping. In some examples, the system 100 may support data mappings from a source data object to one or more customizable target data objects. For example, the system may support personalization and customization by inheriting source schema details into data points (e.g., a data field and a data object) and allowing a user to modify the data points. In some cases, the system 100 may support the altering of a data mapping. For example, the source data may be preserved by the system 100, and the data model schema may be updated to alter the data mapping (e.g., change a data type, change a data label, apply a function to source data, map an additional field, etc.). Based on preserving the original source data using source data objects, the system 100 may update the model data objects (e.g., custom data objects, standard data objects, or both) using the preserved original source data and an updated data mapping. In this way, the system 100 may refrain from re-ingesting source data when updating the data mapping, reducing the processing latency and overhead associated with updating the data mapping.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
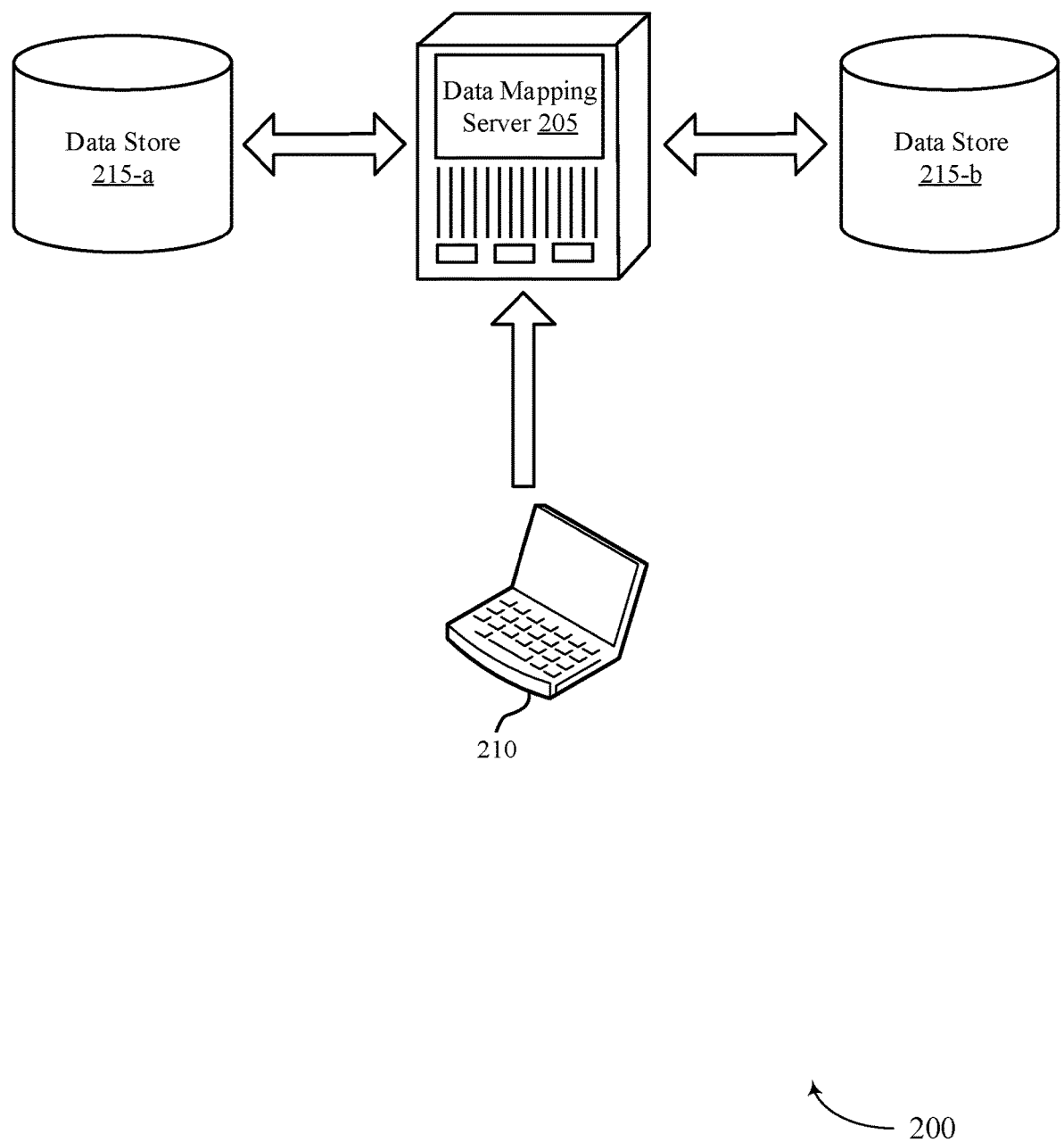

FIG. 2 illustrates an example of a system 200 for data mapping that supports creating an extensible and scalable data mapping and modeling experience in accordance with aspects of the present disclosure. The system 200 may include a data mapping server 205 (e.g., a data ingestion server), a user device 210, and a number of data stores 215. The system 200 may implement aspects of a system 100 as described with reference to FIG. 1. For example, a data mapping server 205 and/or a data store 215 may be an example or component of a data center 120. A user device 210 may implement aspects of subsystem 125, a cloud client 105, or a contact 110 as described with reference to FIG. 1.

The data mapping server 205 may represent aspects of an application server, communication server, data processing server, database server, cloud-based server, server cluster, virtual machine, container, or some similar data processing device or system. The data mapping server 205 may communicate with other devices such as one or both of a data store 215 and/or a user device 210. The data mapping server 205 may receive a first indication of a source schema (e.g., information defining how source data and/or source metadata is formatted and/or stored at a data source) that includes a set of data fields for a data object. For example, a user associated with user device 210 may indicate a source database, and the data mapping server 205 may receive a user input from the user device 210 that indicates database objects, table, fields, data, or data references. For example, a user operating the user device 210 may select a source data object to import from the data source into a data model object. In some cases, the data mapping server 205 may fetch the source schema from the data source (e.g., based on the selected source data object to import).

The data mapping server 205 may receive a user input indicating creation of a custom data object. For example, the user operating the user device 210 may indicate in the user interface of the user device 210 (e.g., by selecting a button) to create a custom data object. The data mapping server 205 may create the custom data object based on the user input. In some additional or alternative cases, the data mapping server 205 may create the custom data object based on the user input, a source object, the source schema, or a combination thereof. For example, the data mapping server 205 may analyze the source object and create the custom data object based on the analysis. In some examples, the data mapping server 205 may analyze the source object to determine a type of data associated with the source object, an amount of data associated with the source object, or metadata associated with the source object, and the data mapping server 205 may create the custom data object based on the analysis. In some cases, the data mapping server 205 may perform one or more operations on the source object when creating the custom data object. For example, the data mapping server 205 may convert a data type associated with the source object to a different data type, alter a data label associated with the source object, merge multiple source objects into the custom object, or any combination thereof.

The data mapping server 205 may automatically map one or more data fields of the set of data fields for the source data object to one or more custom data fields for the custom data object based on the source schema. In some cases, the data mapping server 205 may base one or more of the mappings on the source schema structure, database snapshots associated with the source schema, database objects associated with the source schema, or metadata associated with the source schema. In some cases, the automatic mapping may involve a machine-learned algorithm that predicts fields, data types, properties, and labels associated with source data fields (e.g., using natural language processing (NLP), data structure analysis, one or more user inputs or data definitions, or some combination thereof). In some cases, a user may modify the automatic mapping, and the machine-learned algorithm may implement a feedback mechanism to update the model for automatic mapping based on the user's modifications.

The data mapping server 205 may import a set of data records from the data source (e.g., data store 215-*a*). The data mapping server 205 may import the set of data records according to the source schema. For example, the data mapping server 205 may identify one or more data types (e.g., integer, string, varchar, float, blob, etc.) associated with the source schema and import the set of data records based on the source schema and/or the identified one or more data types. In some cases, the data mapping server 205 may improve system efficiency by automatically importing data records stored at a data source (e.g., data store 215-*a*). In some examples, the importing may be performed according to a defined schedule (e.g., a refresh schedule for the data source).

The data mapping server 205 may store the set of data records in a data store (e.g., data store 215-*b*) according to a custom schema, and the custom schema may include the one or more custom data fields for the data object. In some examples, the data mapping server 205 may automatically generate the custom schema for improved system efficiency and user experience. For example, the data mapping server 205 may generate the custom schema to support the data types associated with the source data object, and the data mapping server 205 may alter (e.g., compress, encrypt, etc.) the source data object to reduce system load and/or improve system security. In some cases, the data mapping server 205 may store the source data in a central location (e.g., a data lake). The data lake may preserve the source data, improve system reliability, and support the mapping of source data to be updated or altered. In some examples, the data mapping server 205 may map source data (e.g., data associated with data store 215-*a*) to target data (e.g., data associated with data store 215-*b*) based on a schema associated with data store 215-*b*.

In some cases, the custom data schema associated with the data store 215-*b* may be altered. Altering the schema associated with the data store 215-*b* may alter how source data is ingested by the data mapping server 205. Furthermore, based on the data store 215-*b* preserving the original data ingested from data store 215-*a*, altering the schema may retroactively alter the mapping of source data previously ingested. The data mapping server 205 may map data from multiple different sources to a set of customizable target data model objects supported by the data lake. In this way, the data mapping server 205 may support efficient data modeling using data (e.g., user information) from multiple different sources. In one example, the data mapping server 205 may support grouping users into user segments (e.g., groups of users with one or more shared characteristics) based on mapping the data for the users into the data lake. The data mapping server 205 may identify user data from different sources that correspond to a same user (e.g., based on mapping the user data to a same custom data object) and may aggregate the data into a single data object corresponding to the user.

In some cases, the data mapping server 205 may improve the system performance and/or the creation of system metrics. For example, the data mapping server 205 may reconcile user identifies by identifying a user identity associated with a custom data object and/or data store 215-*b* as well as a source data object and/or data store 215-*a*. Reconciling user identifies and or storing an indication of associated user identifiers can improve system performance (e.g., store associated records together for faster lookup) and/or the creation of system metrics (e.g., by more accurately capturing the user population). For example, an analytics system may determine when a customer begins an order on a first user device and completes the order on the first device, begins an order on a first user device and completes the order a second user device, begins an order on a first device and does not complete the order, etc. In some examples, the data mapping server 205 may improve user experience by supporting generating and/or maintaining cross-device user identifies. For example, a first data source may contain home insurance search information associated with a first user device, and a second data source may contain car insurance search information associated with a second user device. In some cases, the first user device and the second user device may be associated with a user, and the data mapping server 205 may use identify reconciliation to determine that the user is searching for both home insurance and car insurance and suggest a bundled home and car insurance product.

In some cases, the data mapping server 205 may support improved data segmentation. For example, storing data in a central data store (e.g., data lake) may improve data segmentation by reducing data-access time (e.g., querying latency). For example, a data lake may leverage locality of reference to more efficiently read and/or write data to the data lake, and therefore improve the efficiency of data segmentation. These efficiencies may be gained across data object types based on connections (e.g., linkages) between different data objects. For example, a custom data object may be linked to one or more standard data objects, one or more additional custom data objects, or both, such that querying for the custom data object may support efficient look up of the related standard and/or custom data objects.

Figure 3:
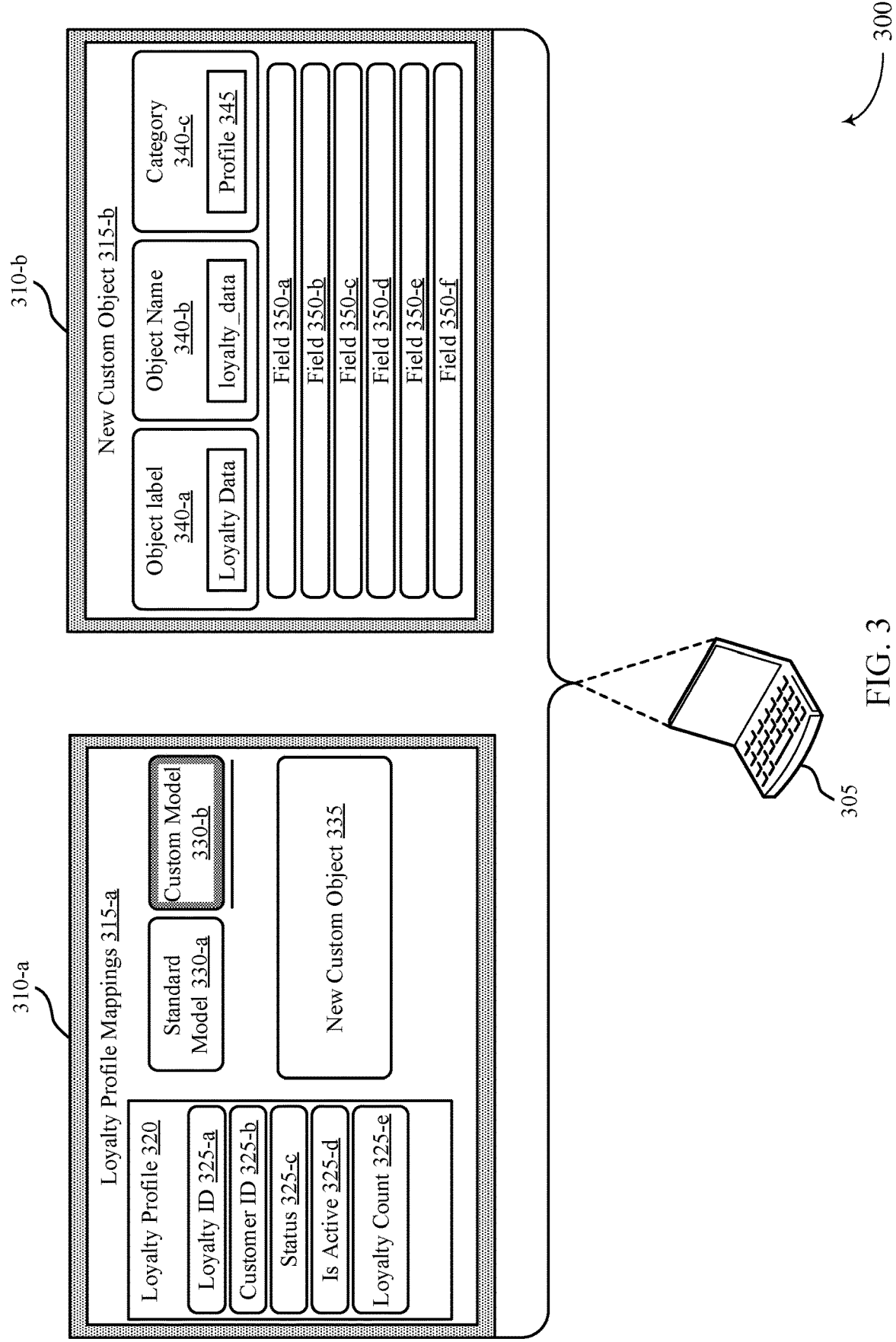
FIG. 3 illustrates an example of a user interface sequence that supports creating an extensible and scalable data mapping and modeling experience in accordance with aspects of the present disclosure.

FIG. 3 illustrates an example of a user interface sequence 300 that supports creating an extensible and scalable data mapping and modeling experience in accordance with aspects of the present disclosure. The user interface sequence 300 may support a user selecting to create a custom data model (e.g., where a target object for data mapping is a custom data object created and modified by the user operating the user device 305). In some examples, the target objects may be custom objects, standard objects, or hybrid objects (e.g., standard objects with custom fields). The user interface sequence 300 may be one specific example of a custom data model mapping (e.g., for a loyalty data object). However, it is to be understood that many other data model mapping operations are supported within the scope of the claims.

User interface 310-*a* may be an example of a user interface that supports the selection of source data by a user. For example, the user may select loyalty profile 320 as the source data. This loyalty profile 320 may correspond to a source schema fetched or otherwise identified from a data source. In some cases, the data mapping system may retrieve the loyalty profile information stored at the data source and may store the loyalty profile information in data source entities (e.g., to preserve the loyalty profile information as it is stored at the data source). User interface 310-*a* may present a loyalty profile view 315-*a*. The loyalty profile 320 may include a number of fields associated with the loyalty profile 320. For example, loyalty identifier (ID) 325-*a*, customer ID 325-*b*, status 325-*c*, "is active" 325-*d*, and loyalty count 325-*e* may be data fields associated with the loyalty profile 320. In some examples, loyalty profile 320 may represent source data, and the loyalty attributes 325 may be attributes or fields associated with the source data (e.g., according to the source schema).

The user interface 310-*a* may support the creation of standard model objects, custom model objects, hybrid model objects (e.g., standard model objects with additional custom fields), or some combination thereof. For example, the creation of a standard model object may be initiated through the selection of standard model button 330-*a* and the creation of a custom model object may be initiated through the selection of custom model button 330-*b*. In some cases, the user may select the new custom object button 335, and the creation of a new model object may be initiated. In some other cases, the user may select a standard object or a custom object that has previously been defined for mapping the source data. For example, the user could map the loyalty profile 320 to a standard object published for global use, a custom object previously created by the user, or a new custom object. In some examples, the data mapping system may suggest a mapping to an object (e.g., using NLP, machine learning, data structure analysis, etc.). For example, the system may identify an already created object for the data model corresponding to a loyalty profile and may automatically select to map the loyalty profile 320 to the identified object. In some cases, a user may confirm or reject the automatic mapping.

In some examples, a user may select the custom model button 330-*b* and initiate the creation of a custom model object through the selection of the new custom object button 335. In some such examples, user interface 310-*b* may be an example of a user interface that supports creating a new custom object. User interface 310-*b* may display new custom object view 315-*b*. The new custom object view 315-*b* may allow a user to define an object label via object label field 340-*a* and an object name via object name field 340-*b*. In one example, a user may select "Loyalty Data" as the object label 340-*a*, "loyalty_data" as the object name (e.g., the object API name), and profile 345 as the category 340-*c* for this new custom object. In some cases, these selections may be pre-populated by the system (e.g., using NLP), but the user may have the ability to customize the pre-populated values.

User interface 310-*b* may support a number of attributes 350. In some cases, these attributes 350 may correspond to one or more of the data fields associated with the loyalty profile 320. Additionally or alternatively, one or more of these attributes 350 may be independent of the data fields. The attributes 350 may support the alteration of data labels, data field names, data keys (e.g., primary keys, foreign keys, etc.), data types, data display formats, or some combination thereof. In some cases, the system may support the mapping from the loyalty data fields 325 to the attributes 350 (e.g., attributes 350-*a*, 350-*b*, 350-*c*, 350-*d*, 350-*e*, 350-*f*, or some combination thereof). A user may change an attribute 350 to alter a data type associated with source data. For example, loyalty field "is active" 325-*d* may be associated with a text data type, and a user may change the data type of field 350-*d* (e.g., mapped from the "is active" 325-*d* data field) from a text type to a Boolean type. The custom object may be created with an "is active" attribute that has a data type of Boolean and, as such, the user interface 310-*b* may support a dynamic mapping system that supports the on-the-fly alteration of data attributes.

The user interface sequence 300 may be a component of a user device and may be operated by a user. The user device or a server (e.g., an application server) may handle backend processing for data mapping and modeling. In some cases, the user interfaces 310-*a*, 310-*b*, 410, and 510 may be aspects of the same user interface. For example, these user interfaces may illustrate possible steps in a data mapping and modeling procedure.

Figure 4:
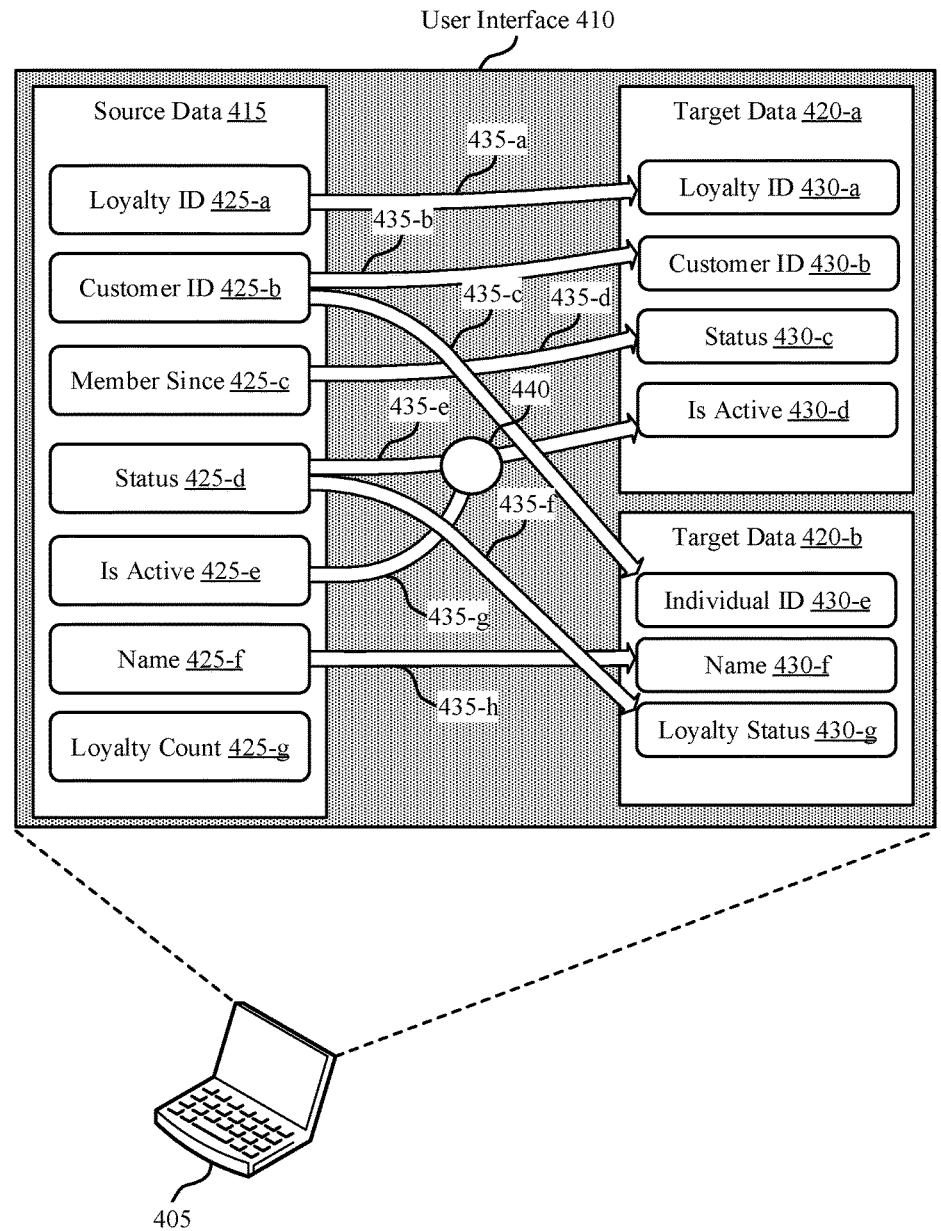
FIGS. 4 and 5 illustrate examples of user devices including user interfaces that support creating an extensible and scalable data mapping and modeling experience in accordance with aspects of the present disclosure.

FIG. 4 illustrates an example of a user device 405 including a user interface 410 that supports creating an extensible and scalable data mapping and modeling experience in accordance with aspects of the present disclosure. The application providing the data mapping and modeling experience may support standard data model objects and custom data model objects. The standard data model and/or custom data model objects may be presented in the user interface 410 (e.g., visually, audibly, tactilely, or in some other form), and a user may create a new object or modify an object in the application (e.g., a custom object or a standard object).

In some cases, a user operating the user device 405 may create a new object from the user interface 410. For example, the user may indicate (e.g., via a checkbox, via a button, etc.) through the user interface 410 one or more objects (e.g., source objects, target objects, or both). The user interface 410 may display previously mapped objects, thereby improving system efficiency and user experience. The user may indicate one or more objects, some of which may be standard objects, custom objects, or any combination thereof. For example, the user may indicate a source object (e.g., corresponding to source data 415) and two target objects, target data object 420-*a* (e.g., a loyalty data object) and target data object 420-*b* (e.g., an individual data object). The user may indicate a number of mappings 435, indicating how source data 415 and source data attributes are mapped to target data attributes. In some cases, one or more source data attributes may be automatically mapped to one or more target data attributes. The user interface 410 may support the creation of new mappings and the alteration of existing mappings. In some cases, the alteration of existing mappings may be applied retroactively and support the dynamic ingestion of data.

In some cases, one or more source data attributes may not be mapped to a target data attribute (e.g., the source data attributes are initially unmapped), and the data mapping and modeling system may preserve both the mapped source data attributes and the unmapped source data attributes. For example, the source data 415 may be stored in a data storage system (e.g., a data lake), and the target data 420 may be created based on the ingestion of the source data 415 in accordance with a data mapping scheme as indicated by the user interface 410. The preservation of mapped source data (e.g., name 425-*f*) and unmapped source data (e.g., loyalty count 425-*g*), as supported by the data mapping and modeling system, may improve data integrity by creating the target data 420 while maintaining the source data 415 in data storage. The preservation of mapped source data and unmapped source data may additionally or alternatively improve system flexibility by supporting the dynamic altering of data mapping schemes. For example, a user may retroactively update the target data object 420-*b* to include a loyalty count field. The system may map the loyalty count 425-*g* from the stored source data 415 to this new loyalty count field in the target data object 420-*b*. Because the system preserves the loyalty count information for the unmapped loyalty count 425-*g* field, the system may update the target data objects 420-*b* stored in the database system (e.g., in the data lake) using the preserved loyalty count information without ingesting (or re-ingesting) any additional source data 415. This may improve the latency and reduce the processing overhead associated with updating the target data object 420-b to include an additional custom field (e.g., as compared to externally retrieving the loyalty count information from the data source in order to add the custom field).

In some cases, the user interface 410 may support the creation of new target data attributes. For example, a user may create, via user interface 410, a new target data attribute. The user may indicate one or more fields associated with the new target data attribute, such as a label, a name, a data type, etc. The user may associate the new target data attribute with a target data object 420. For example, the user may associated the new target data attribute with a standard target data object or a custom data object. The user interface 410 may support the creation of hybrid target data objects through the association of new data attributes to standard target data objects (e.g., thus customizing the fields of the standard data objects).

In some cases, target data objects 420 may be associated with standard data objects. For example, a relationship of a new target data object 420 to a standard data object may be defined. The relationship between the new target data object 420 and the standard data object may be direct (e.g., the new target data object 420 is associated with the standard data object) or indirect (e.g., the new target data object 420 is associated with a custom data object, and the custom data object is associated with a standard data object). In some cases, target data object relationships may improve data analysis techniques. For example, standard objects may support certain data analysis techniques (e.g., statistical summaries, behavior predictions, similarity measurements, etc.), and the relationships of target data objects may support the data analysis techniques being applied to custom data objects. Additionally, query handling may utilize the connections between data objects to improve the querying efficiency. For example, a query may search the data lake based on one data object type, but may retrieve information stored for a different data object type based on a stored connection (e.g., link) between the data object types.

In the specific example illustrated, the source data 415 may include data fields associated with loyalty ID 425-a, customer ID 425-b, "member since" 425-c, status 425-d, "is active" 425-e, name 425-f, loyalty count 425-g, or any combination of these or other relevant fields. The target data object 420-a may include data fields associated with loyalty ID 430-a, customer ID 430-b, status 430-c, "is active" 430-d, or any combination of these or other relevant fields. The target data object 420-b may include data fields associated with individual ID 430-e, name 430-f, loyalty status 430-g, or any combination of these or other relevant fields. The system may automatically map (e.g., based on projected mappings, user inputs, etc.) loyalty ID 425-a to loyalty ID 430-a according to mapping 435-a, "member since" 425-c to status 430-c according to mapping 435-d, and name 425-f to name 430-f according to mapping 435-h. Some source fields may map to multiple target fields. For example, the system may map customer ID 425-b to customer ID 430-b according to mapping 435-b and to individual ID 430-e according to mapping 435-c. Additionally, the system may map status 425-d to "is active" 430-d according to mapping 435-e and to loyalty status 430-g according to mapping 435-f. Furthermore, some target fields may be based on multiple source fields. For example, the system may map status 425-d and "is active" 425-e to "is active" 430-d based on the mappings 435-e and 435-g and some combination logic 440. For example, the combination logic 440 may include one or more formulas or functions to determine an output value based on multiple input values. Furthermore, in some cases, a mapping 435 may include additional logic for transforming the input value to an output value (e.g., to convert data types, calculate final values, etc.). However, it is to be understood that many other data model mappings are supported within the scope of the claims.

Figure 5:
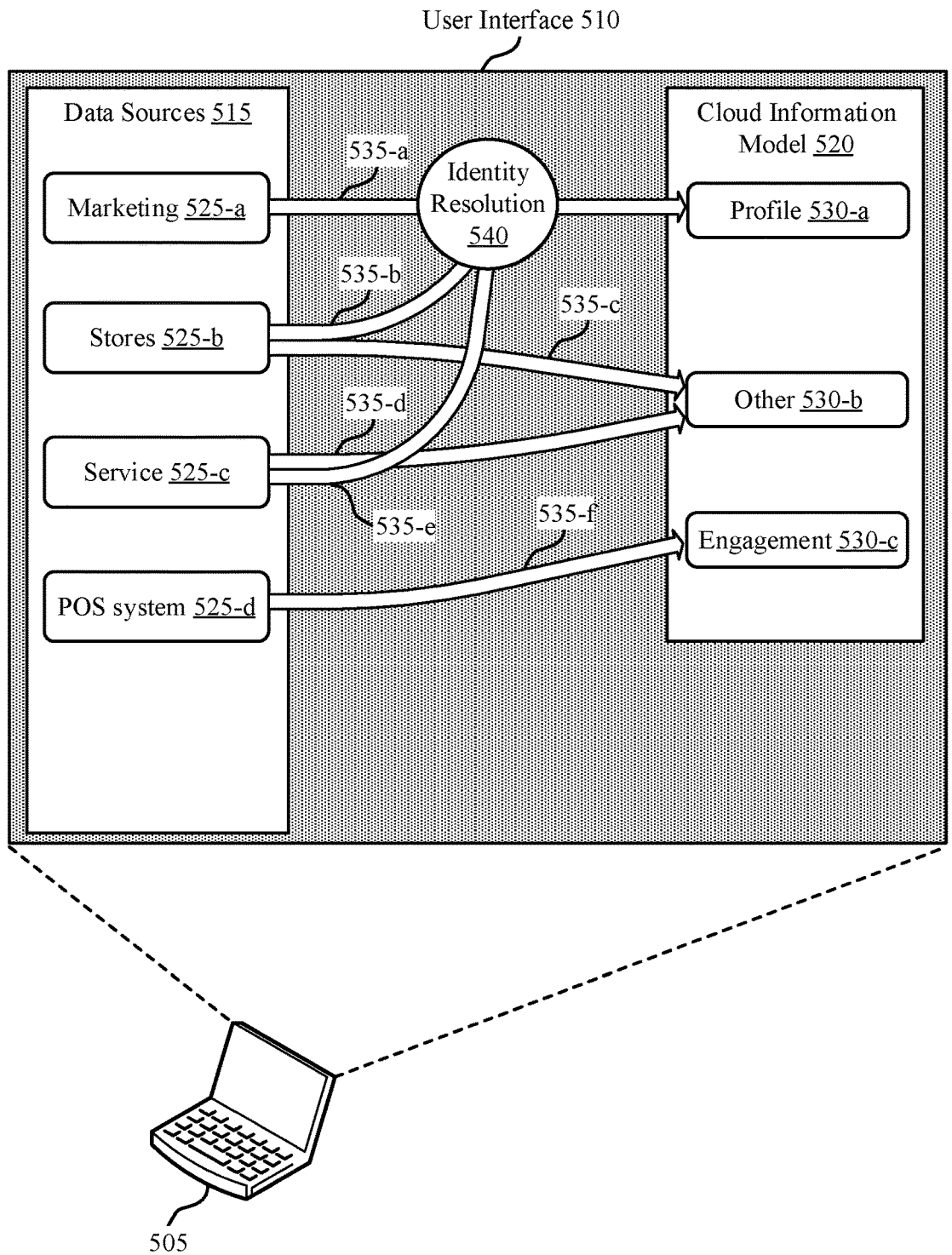

FIG. 5 illustrates an example of a user device 505 including a user interface 510 that supports creating an extensible and scalable data mapping and modeling experience in accordance with aspects of the present disclosure. The user interface 510 may provide a data visualization. For example, the user interface 510 may illustrate data streams into a database system. In some cases, the data visualization may allow a user to better understand disparate data schemes. The data sources 515 may contain a number of source data schemes 525, and the cloud information model 520 (e.g., at a customer data platform (CDP), cloud information model, etc.) may contain a number of target data schemes 530. In some cases, the user interface 510 may display a mapping of source data schemes 525 to target data schemes 530 via a number of mapping 535. In some cases, the user interface 510 may improve user identity resolution through identity resolution 540 (e.g., by resolving and aggregating user information corresponding to a single user from across multiple disparate data sources). In some cases, the user interface 510 may create a common shared language between disparate data schemes. In some cases, sets of mappings may enable CDP to resolve identify for profile data, create rich insights, or drive data segmentation. The system may support a user interface that provides a single view for bringing data into the system and defining what the data means (e.g., how different values or fields of the source data map to different values or fields supported by the system).

In the specific example illustrated, data scheme 525-a (e.g., a marketing system), data scheme 525-b (e.g., a set of stores), and data scheme 525-c (e.g., a service system) may be mapped to a same target data scheme 530-a (e.g., a profile model). That is, according to mapping 535-a, mapping 535-b, mapping 535-e, and identity resolution 540, the system can ingest user information from siloed data sources 515 and aggregate across the sources to determine user profiles. As such, a single data model object (e.g., a standard or custom data object) may use information from multiple different data sources 515, supporting valuable segmentation, activation, analytics, and insights across data ingested from multiple disparate data sources 515. Additionally or alternatively, data scheme 525-b (e.g., a set of stores) may be mapped to target data scheme 530-b (e.g., another model) according to mapping 535-c, data scheme 525-c (e.g., a service system) may be mapped to target data scheme 530-b (e.g., another model) according to mapping 535-d, and data scheme 525-d (e.g., a point of sales (POS) system) may be mapped to target data scheme 530-c (e.g., an engagement model) according to mapping 535-f. However, it is to be understood that many other data model mappings are supported within the scope of the claims.

Figure 6:
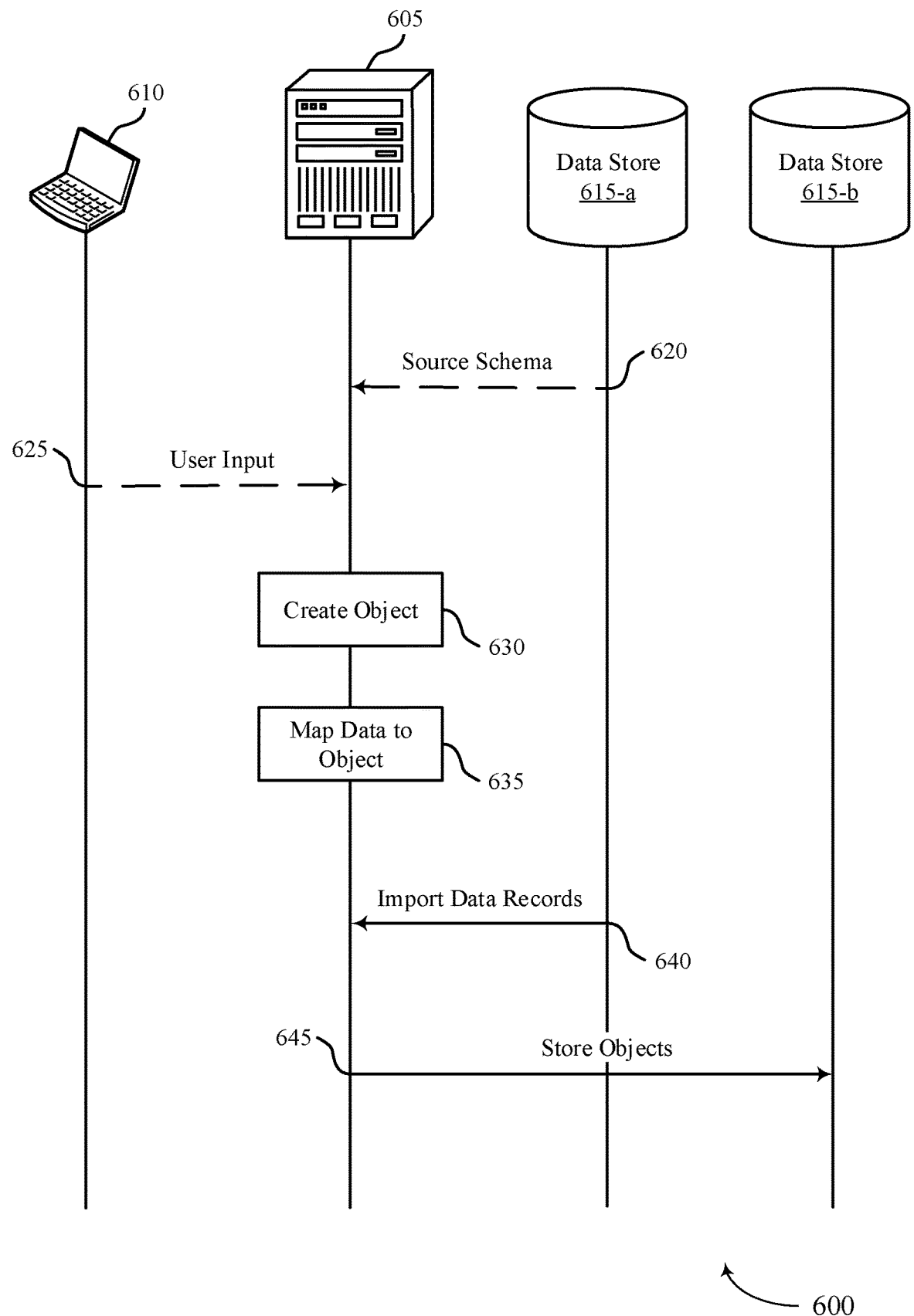
FIG. 6 shows an example of a process flow that supports creating an extensible and scalable data mapping and modeling experience in accordance with aspects of the present disclosure.

FIG. 6 illustrates an example of a process flow 600 that supports creating an extensible and scalable data mapping and modeling experience in accordance with aspects of the present disclosure. The process flow 600 includes a data mapping server 605, a user device 610, and a number of data stores 615. These may be examples of the corresponding devices described with reference to FIGS. 1 through 5. The data mapping server 605 may serve a database system (e.g., such as data store 615-b, which may include a data lake) and may implement data mapping to map one or more data fields for a source data object to one or more custom data fields for a custom data object. Data mapping server 605 may improve user experience, preserve source data, and support the altering of data mappings (e.g., at data stream creation and subsequently using the preserved source data). Alternative examples of the following may be implemented, where some steps are performed in a different order than described or are not performed at all. In some cases, steps may include additional features not mentioned below, or further steps may be added.

At 620, the data mapping server 605 may receive an indication of a source schema for a data source (e.g., data store 615-a). The source schema may include a set of data fields for a source data object. In some cases, a user may input an indication of the source schema. In some other cases, the data mapping server 605 may fetch the source schema from the data source.

At 625, the data mapping server 605 may receive a user input indicating creation of a custom data object. In some cases, the user input may indicate a relationship between the custom data object and another data object (e.g., a standard data object or another custom data object). For example, the custom data object may inherit data fields and/or properties from a standard data object. In some additional or alternative examples, the user input may indicate data fields and/or properties for the custom data object.

At 630, the data mapping server 605 may create the custom data object based on the user input. For example, the data mapping server 605 may create the custom data object, and the custom data object may include data fields and/or properties indicated in the user input. This custom data object may support unique mappings for specific users or data sources, while also supporting reuse for other users and/or sources. Additionally or alternatively, the custom data object may support customizations by a user at creation time and/or after creation. The user may create this custom data object without writing any software code (e.g., by using the supported user interfaces). This may reduce the latency involved in custom data object creation.

At 635, the data mapping server 605 may automatically map one or more data fields of the set of data fields for the source data object to one or more custom data fields for the custom data object based on the source schema. For example, the data mapping server 605 may identify data types associated with source data object, and the data mapping server 605 may map data fields of the source data object to data fields of the custom data object based on the identified data types. In some additional or alternative example, the data mapping server 605 may map data fields of the source data object to data fields of the custom data object based on data labels associated with the source data object (e.g., using NLP techniques). A user may review the data mappings and, in some examples, may modify the data mappings. As such, the user may define a custom data schema on-the-fly for data mapping. In some cases (e.g., for hybrid mapping), a portion of data from the source data object may be mapped to a standard data object and a portion of data from the source data object may be mapped to a custom data object. The standard and custom data objects may be connected (e.g., linked) in the database system, and the portions of data may overlap or be mutually exclusive.

At 640, the data mapping server 605 may import a set of data records stored at data store 615-a (e.g., the data source). In some cases, the set of data records may be imported from data store 615-a according to a source schema associated with data store 615-a.

At 645, the data mapping server 605 may store the set of data records at data store 615-b (e.g., a database system supporting data modeling) according to a custom schema, where the custom schema includes the one or more custom data fields for the custom data object. In this way, the data mapping server 605 may ingest data into a single model or location from different data sources that use different schemas, different logic, or both. The data mapping resolves these differences between sources and can create a common language between the disparate data sources.

In some cases, the data mapping server may additionally store the set of data records at the data store 615-b according to the source schema to preserve the original data (e.g., including data unmapped to the custom schema). In this way, the system may refrain from dropping any data at ingestion time, no matter the data mapping. This may allow the system to refrain from re-ingesting any data at a later time if the data mapping is modified (e.g., such that previously unmapped data is now mapped to a data field in a standard or custom data object).

The system (e.g., automatically or based on a user input) may perform operations using the set of data records stored according to the custom schema. For example, the custom schema may support data modeling, segmentation (e.g., segmenting a set of users into one or more target audiences), activation (e.g., of target audiences back into a system, such as an email application or a marketing application), insights (e.g., based on the audience data), or any combination of these or other operations.

Figure 7:
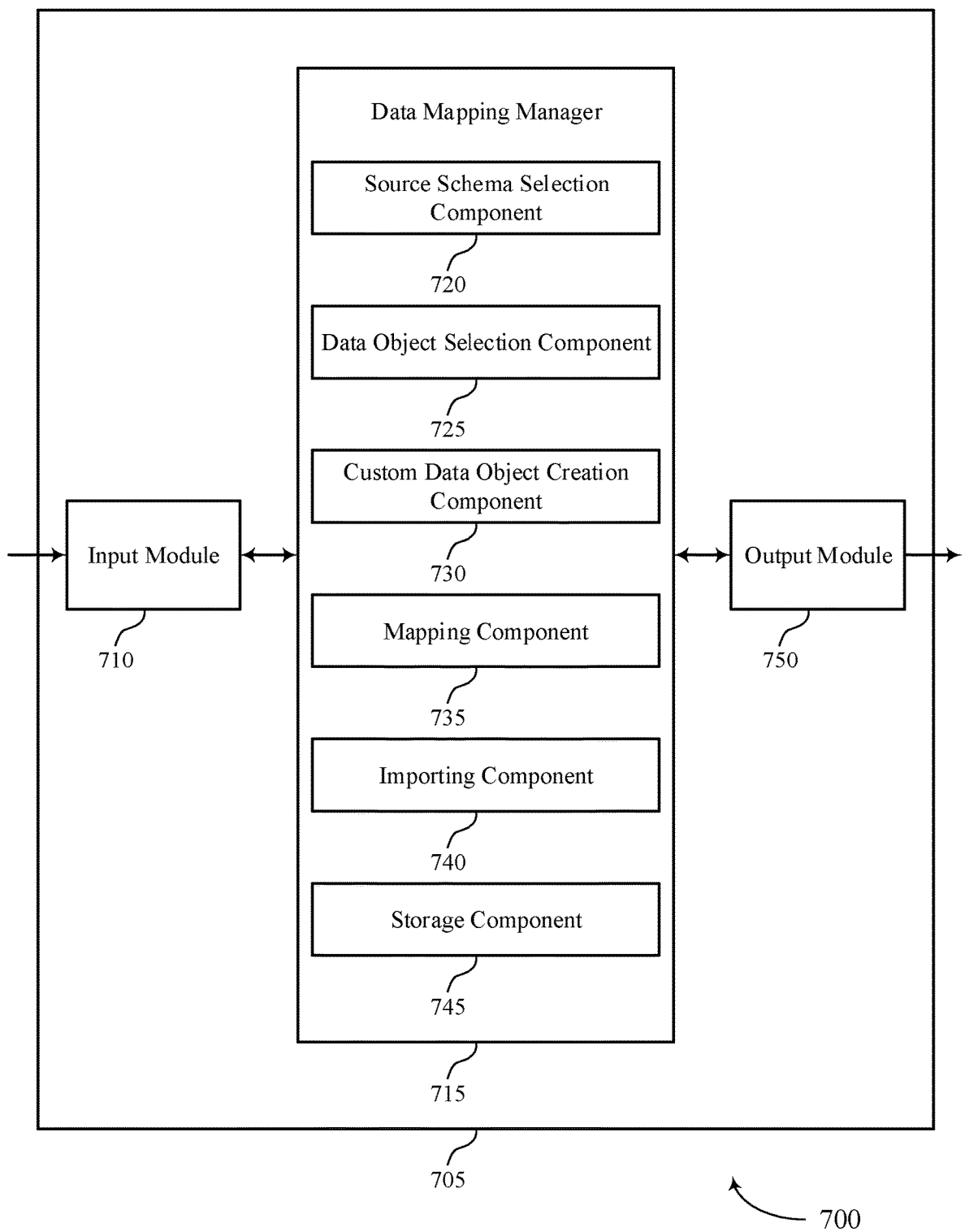
FIG. 7 shows a block diagram of an apparatus that supports creating an extensible and scalable data mapping and modeling experience in accordance with aspects of the present disclosure.

FIG. 7 shows a block diagram 700 of an apparatus 705 that supports creating an extensible and scalable data mapping and modeling experience in accordance with aspects of the present disclosure. The apparatus 705 may include an input module 710, a data mapping manager 715, and an output module 750. The apparatus 705 may also include a processor. Each of these components may be in communication with one another (e.g., via one or more buses). In some cases, the apparatus 705 may be an example of a user terminal, a database server, or a system containing multiple computing devices. For example, the apparatus 705 may be a data mapping server, which may be an example of a single server, a server cluster, an application server, a database server, a cloud-based server, a container, a virtual machine, a user device, or any other system or device supporting data processing.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the data mapping manager 715 to support data mapping. In some cases, the input module 710 may be a component of an input/output (I/O) controller 915 as described with reference to FIG. 9.

The data mapping manager 715 may include a source schema selection component 720, a data object selection component 725, a custom data object creation component 730, a mapping component 735, an importing component 740, and a storage component 745. The data mapping manager 715 may be an example of aspects of the data mapping manager 805 or 910 described with reference to FIGS. 8 and 9.

The data mapping manager 715 and/or at least some of its various sub-components may be implemented in hardware, software executed by a processor, firmware, or any combination thereof. If implemented in software executed by a processor, the functions of the data mapping manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data mapping manager 715 and/or at least some of its various sub-components may be physically located at various positions, including being distributed such that portions of functions are implemented at different physical locations by one or more physical devices. In some examples, the data mapping manager 715 and/or at least some of its various sub-components may be a separate and distinct component in accordance with various aspects of the present disclosure. In other examples, the data mapping manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The source schema selection component 720 may receive an indication of a source schema for a data source, where the source schema includes a set of data fields for a source data object. The data object selection component 725 may receive a user input indicating creation of a custom data object. The custom data object creation component 730 may create the custom data object based on the user input. The mapping component 735 may automatically map one or more data fields of the set of data fields for the source data object to one or more custom data fields for the custom data object based on the source schema.

The importing component 740 may import, from the data source, a set of data records stored at the data source according to the source schema. The storage component 745 may store, in a database system, the set of data records according to a custom schema, where the custom schema includes the one or more custom data fields for the custom data object.

The output module 750 may manage output signals for the apparatus 705. For example, the output module 750 may receive signals from other components of the apparatus 705, such as the data mapping manager 715, and may transmit these signals to other components or devices. In some specific examples, the output module 750 may transmit output signals for display in a user interface, for storage in a database or data store, for further processing at a server or server cluster, or for any other processes at any number of devices or systems. In some cases, the output module 750 may be a component of an I/O controller 915 as described with reference to FIG. 9.

Figure 8:
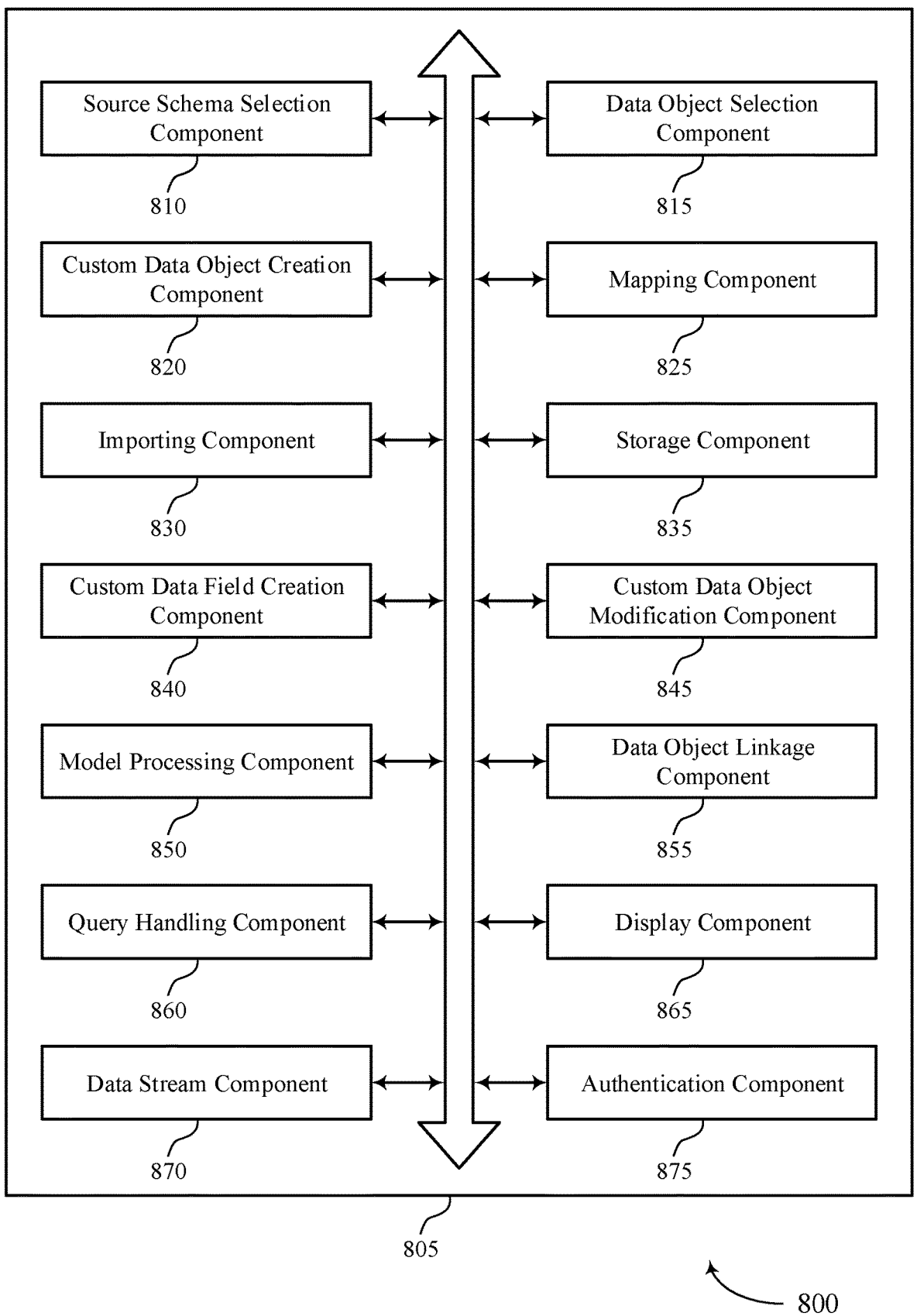
FIG. 8 shows a block diagram of a data mapping manager that supports creating an extensible and scalable data mapping and modeling experience in accordance with aspects of the present disclosure.

FIG. 8 shows a block diagram 800 of a data mapping manager 805 that supports creating an extensible and scalable data mapping and modeling experience in accordance with aspects of the present disclosure. The data mapping manager 805 may be an example of aspects of a data mapping manager 715 or a data mapping manager 910 described herein. The data mapping manager 805 may include a source schema selection component 810, a data object selection component 815, a custom data object creation component 820, a mapping component 825, an importing component 830, a storage component 835, a custom data field creation component 840, a custom data object modification component 845, a model processing component 850, a data object linkage component 855, a query handling component 860, a display component 865, a data stream component 870, and an authentication component 875. Each of these modules may communicate, directly or indirectly, with one another (e.g., via one or more buses).

The source schema selection component 810 may receive an indication of a source schema for a data source, where the source schema includes a set of data fields for a source data object. The data object selection component 815 may receive a user input indicating creation of a custom data object. The custom data object creation component 820 may create the custom data object based on the user input. The mapping component 825 may automatically map one or more data fields of the set of data fields for the source data object to one or more custom data fields for the custom data object based on the source schema. The importing component 830 may import, from the data source, a set of data records stored at the data source according to the source schema. The storage component 835 may store, in a database system, the set of data records according to a custom schema, where the custom schema includes the one or more custom data fields for the custom data object.

In some cases, the storage component 835 may additionally store, in the database system, the set of data records according to the source schema. For example, the storage component 835 may store two separate entities, a data source entity (e.g., according to the source schema) to preserve the original data and a data model entity (e.g., according to the custom schema) to provide meaning to the data through mapping. In some examples, the mapping component 825 may receive a second user input indicating a mapping from a data field of the set of data fields for the source data object to a custom data field of the custom data object. The custom data object modification component 845 may update the set of data records stored according to the custom schema based on the second user input, where the updating involves mapping a set of values from the data field of the set of data records stored according to the source schema to the custom data field of the set of data records stored according to the custom schema. In some examples, the data field is initially unmapped to the custom data object based on the automatic mapping, and the set of values from the data field is preserved in the database system based on storing the set of data records according to the source schema. Additionally or alternatively, the updating may be performed internal to the database system (e.g, without re-ingesting the data records from the data source) based on storing both the set of data records according to the custom schema and the set of data records according to the source schema.

In some examples, the source schema selection component 810 may receive a second indication of a second source schema different from the source schema for a second data source different from the data source, where the second source schema includes a second set of data fields for a second source data object. In some such examples, the data object selection component 815 may receive a third user input indicating the custom data object. The mapping component 825 may automatically map one or more data fields of the second set of data fields for the second source data object to the one or more custom data fields for the custom data object based on the second source schema.

In some examples, the source schema selection component 810 may receive a third indication of a third source schema different from the source schema for a third data source different from the data source, where the third source schema includes a third set of data fields for a third source data object. In some such examples, the data object selection component 815 may receive a fourth user input indicating a standard data object. The mapping component 825 may receive a fifth user input indicating a mapping for one or more data fields of the third set of data fields for the third source data object to one or more standard data fields for the standard data object.

In some examples, the custom data field creation component 840 may receive a sixth user input indicating creation of a custom data field for the standard data object and a mapping from a data field of the third set of data fields for the third source data object to the custom data field for the standard data object. The custom data field creation component 840 may create the custom data field for the standard data object based on the sixth user input. The mapping component 825 may map a set of values from the data field of the third set of data fields for the third source data object to the custom data field for the standard data object based on the sixth user input.

The custom data object modification component 845 may receive a seventh user input and may modify a custom data field of the one or more custom data fields, a mapping of the automatic mapping, or a combination thereof based on the seventh user input. In some examples, modifying the custom data field of the one or more custom data fields may involve changing a label of the custom data field, a data type of the custom data field, a property of the custom data field, or a combination thereof.

In some examples, receiving the indication of the source schema for the data source involves the source schema selection component 810 fetching the source schema from the data source. In some other examples, receiving the indication of the source schema for the data source involves the source schema selection component 810 receiving an eighth user input indicating the source schema for the data source.

The model processing component 850 may perform data segmentation, activation, analysis, or a combination thereof based on the set of data records stored according to the custom schema.

The data object linkage component 855 may store, in the database system, an indication of a connection between the custom data object and a standard data object. The query handling component 860 may receive, at the database system, a query message including a search criterion based on the custom data object and a return value associated with the standard data object. The query handling component 860 may search the database system using the search criterion and the custom data object and may retrieve, from the database system, information from the standard data object based on the return value, the connection between the custom data object and the standard data object, and the searching.

The display component 865 may transmit, for display in a user interface of a user device, an indication of the automatic mapping of the one or more data fields of the set of data fields for the source data object to the one or more custom data fields for the custom data object, where the user input is received via the user interface of the user device.

The data stream component 870 may store, in the database system, an indication of a data stream from the data source to the database system according to a mapping from the source data object to the custom data object. The data stream component 870 may import, from the data source, an additional set of data records stored at the data source based on the data stream and may store, in the database system, the additional set of data records according to the custom schema based on the mapping from the source data object to the custom data object. In some cases, the data stream component 870 may receive a ninth user input indicating a refresh schedule for the data source, where the additional set of data records is imported based on the refresh schedule for the data source.

The authentication component 875 may receive, from a user device, a tenth user input indicating the data source. The authentication component 875 may identify an authentication procedure for the data source, transmit, to the user device, a request for authentication information for the authentication procedure for the data source, and receive, from the user device, the authentication information, where the indication of the source schema for the data source is received based on performing the authentication procedure for the data source using the received authentication information.

Figure 9:
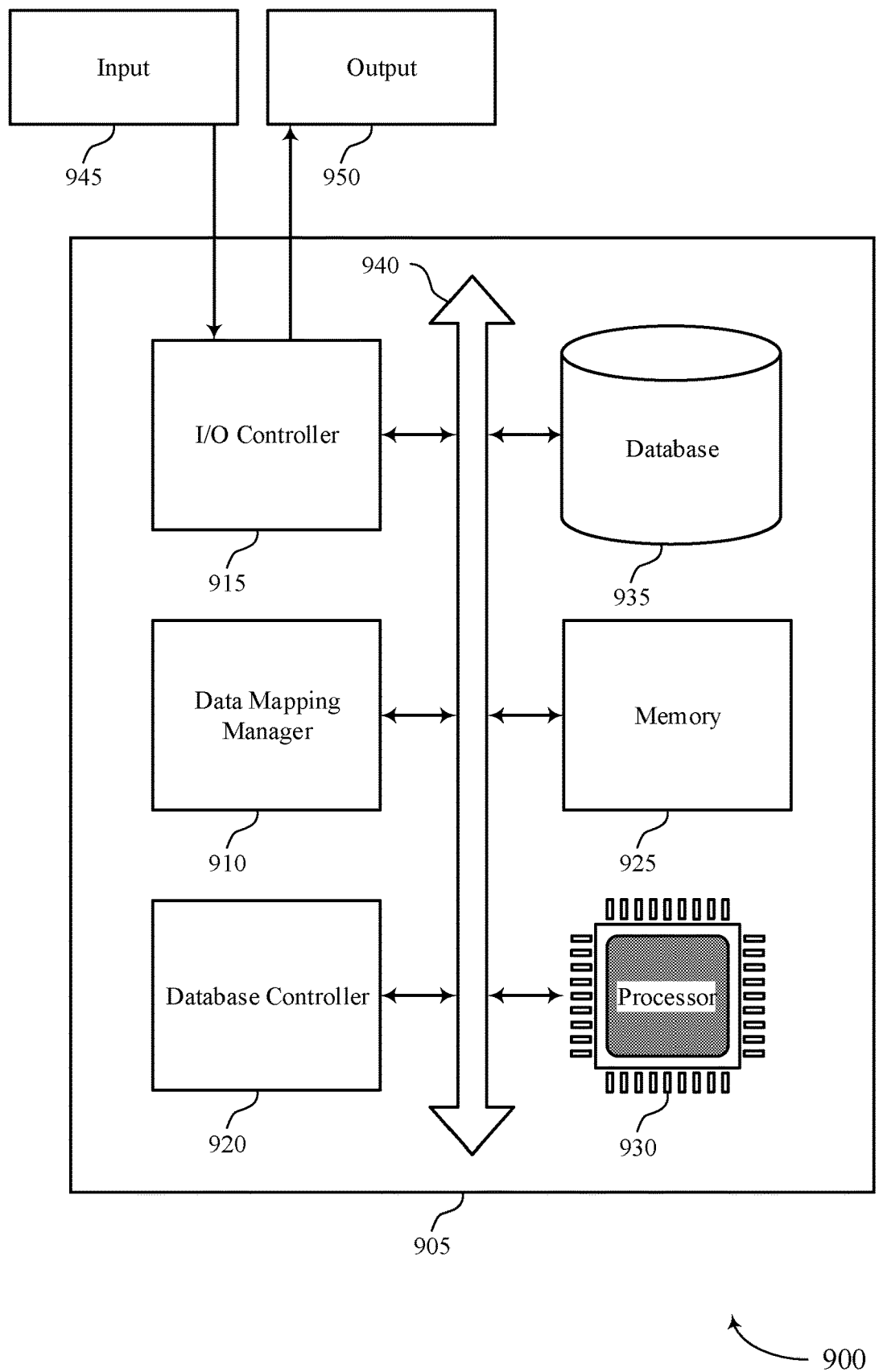
FIG. 9 shows a diagram of a system including a device that supports creating an extensible and scalable data mapping and modeling experience in accordance with aspects of the present disclosure.

FIG. 9 shows a diagram of a system 900 including a device 905 that supports creating an extensible and scalable data mapping and modeling experience in accordance with aspects of the present disclosure. The device 905 may be an example of or include the components of a data mapping server or an apparatus 705 as described herein. The device 905 may include components for bi-directional data communications including components for transmitting and receiving communications, including a data mapping manager 910, an I/O controller 915, a database controller 920, memory 925, a processor 930, and a database 935. These components may be in electronic communication via one or more buses (e.g., bus 940).

The data mapping manager 910 may be an example of a data mapping manager 715 or 805 as described herein. For example, the data mapping manager 910 may perform any of the methods or processes described above with reference to FIGS. 7 and 8. In some cases, the data mapping manager 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting creating an extensible and scalable data mapping and modeling experience).

Figure 10:
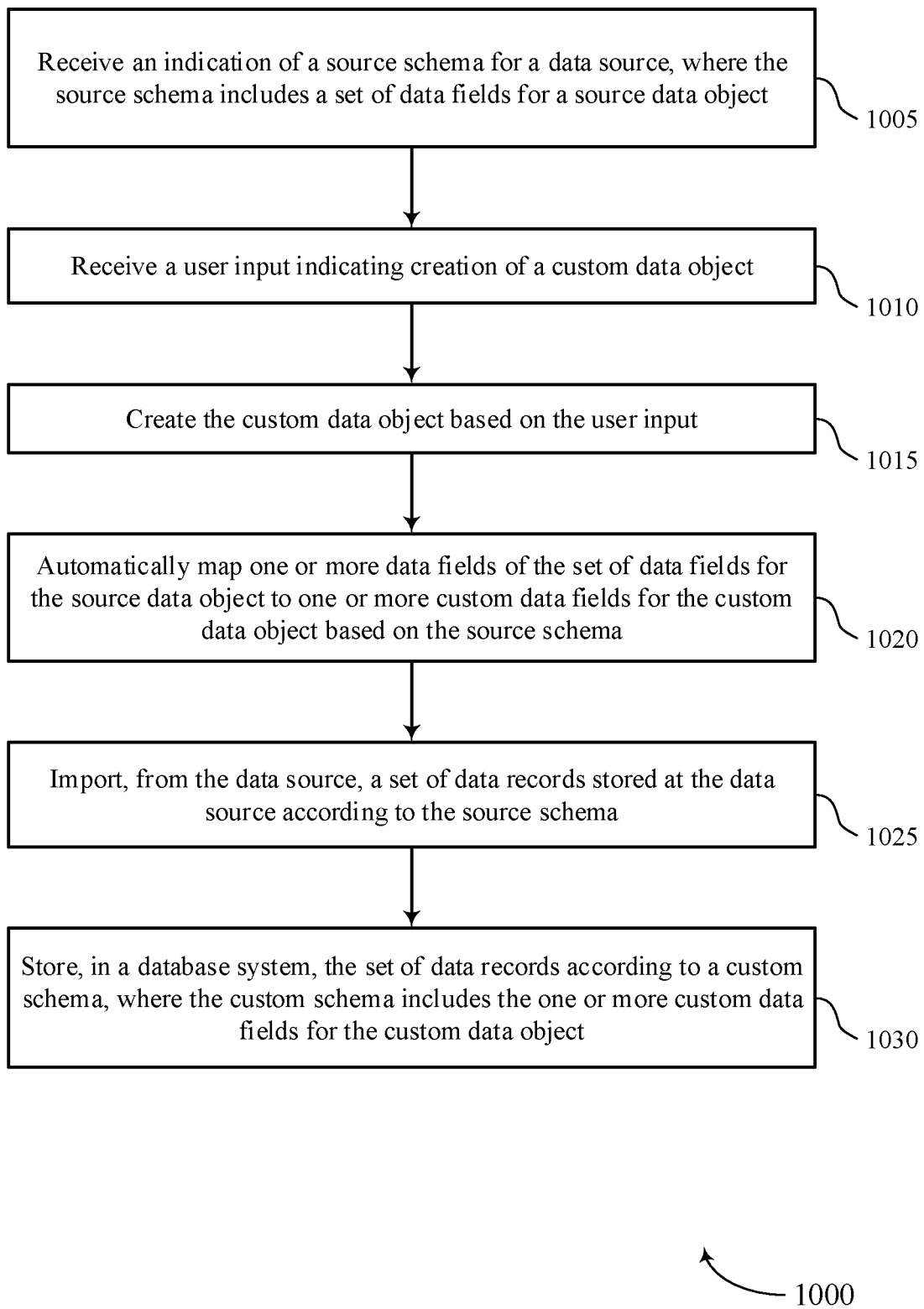
FIG. 10 shows a flowchart illustrating a method that supports creating an extensible and scalable data mapping and modeling experience in accordance with aspects of the present disclosure.

FIG. 10 shows a flowchart illustrating a method 1000 that supports creating an extensible and scalable data mapping and modeling experience in accordance with aspects of the present disclosure. The operations of method 1000 may be implemented by an application server or its components as described herein. For example, the operations of method 1000 may be performed by a data mapping manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1005, the application server (e.g., a data mapping server) may receive an indication of a source schema for a data source, where the source schema includes a set of data fields for a source data object. The operations of 1005 may be performed according to the methods described herein. In some examples, aspects of the operations of 1005 may be performed by a source schema selection component as described with reference to FIGS. 7 through 9.

At 1010, the application server may receive a user input indicating creation of a custom data object. The operations of 1010 may be performed according to the methods described herein. In some examples, aspects of the operations of 1010 may be performed by a data object selection component as described with reference to FIGS. 7 through 9.

At 1015, the application server may create the custom data object based on the user input. The operations of 1015 may be performed according to the methods described herein. In some examples, aspects of the operations of 1015 may be performed by a custom data object creation component as described with reference to FIGS. 7 through 9.

At 1020, the application server may automatically map one or more data fields of the set of data fields for the source data object to one or more custom data fields for the custom data object based on the source schema. The operations of 1020 may be performed according to the methods described herein. In some examples, aspects of the operations of 1020 may be performed by a mapping component as described with reference to FIGS. 7 through 9.

At 1025, the application server may import, from the data source, a set of data records stored at the data source according to the source schema. The operations of 1025 may be performed according to the methods described herein. In some examples, aspects of the operations of 1025 may be performed by an importing component as described with reference to FIGS. 7 through 9.

At 1030, the application server may store, in a database system, the set of data records according to a custom schema, where the custom schema includes the one or more custom data fields for the custom data object. The operations of 1030 may be performed according to the methods described herein. In some examples, aspects of the operations of 1030 may be performed by a storage component as described with reference to FIGS. 7 through 9.

A method for data mapping is described. The method may include receiving, at a data mapping server, an indication of a source schema for a data source, where the source schema includes a set of data fields for a source data object; receiving, at the data mapping server, a user input indicating creation of a custom data object; creating, by the data mapping server, the custom data object based on the user input; automatically mapping, by the data mapping server, one or more data fields of the set of data fields for the source data object to one or more custom data fields for the custom data object based on the source schema; importing, from the data source, a set of data records stored at the data source according to the source schema; and storing, in a database system, the set of data records according to a custom schema, where the custom schema includes the one or more custom data fields for the custom data object.

An apparatus for data mapping is described. The apparatus may include a processor, memory coupled with the processor, and instructions stored in the memory. The instructions may be executable by the processor to cause the apparatus to receive, at a data mapping server, an indication of a source schema for a data source, where the source schema includes a set of data fields for a source data object; receive, at the data mapping server, a user input indicating creation of a custom data object; create, by the data mapping server, the custom data object based on the user input; automatically map, by the data mapping server, one or more data fields of the set of data fields for the source data object to one or more custom data fields for the custom data object based on the source schema; import, from the data source, a set of data records stored at the data source according to the source schema; and store, in a database system, the set of data records according to a custom schema, where the custom schema includes the one or more custom data fields for the custom data object.

Another apparatus for data mapping is described. The apparatus may include means for receiving, at a data mapping server, an indication of a source schema for a data source, where the source schema includes a set of data fields for a source data object; means for receiving, at the data mapping server, a user input indicating creation of a custom data object; means for creating, by the data mapping server, the custom data object based on the user input; means for automatically mapping, by the data mapping server, one or more data fields of the set of data fields for the source data object to one or more custom data fields for the custom data object based on the source schema; means for importing, from the data source, a set of data records stored at the data source according to the source schema; and means for storing, in a database system, the set of data records according to a custom schema, where the custom schema includes the one or more custom data fields for the custom data object.

A non-transitory computer-readable medium storing code for data mapping is described. The code may include instructions executable by a processor to receive, at a data mapping server, an indication of a source schema for a data source, where the source schema includes a set of data fields for a source data object; receive, at the data mapping server, a user input indicating creation of a custom data object; create, by the data mapping server, the custom data object based on the user input; automatically map, by the data mapping server, one or more data fields of the set of data fields for the source data object to one or more custom data fields for the custom data object based on the source schema; import, from the data source, a set of data records stored at the data source according to the source schema; and store, in a database system, the set of data records according to a custom schema, where the custom schema includes the one or more custom data fields for the custom data object.

Some examples of the method, apparatuses, and non-transitory computer-readable medium described herein may further include operations, features, means, or instructions for storing, in the database system, the set of data records according to the source schema.

Some examples of the method, apparatuses, and non-transitory computer-readable medium described herein may further include operations, features, means, or instructions for receiving, at the data mapping server, a second user input indicating a mapping from a data field of the set of data fields for the source data object to a custom data field of the custom data object and updating, in the database system, the set of data records stored according to the custom schema based on the second user input, where the updating includes operations, features, means, or instructions for mapping a set of values from the data field of the set of data records stored according to the source schema to the custom data field of the set of data records stored according to the custom schema.

In some examples of the method, apparatuses, and non-transitory computer-readable medium described herein, the data field is initially unmapped to the custom data object based on the automatic mapping and the set of values from the data field is preserved in the database system based on the storing the set of data records according to the source schema.

In some examples of the method, apparatuses, and non-transitory computer-readable medium described herein, the updating is performed internal to the database system based on storing both the set of data records according to the custom schema and the set of data records according to the source schema.

Some examples of the method, apparatuses, and non-transitory computer-readable medium described herein may further include operations, features, means, or instructions for receiving, at the data mapping server, a second indication of a second source schema different from the source schema for a second data source different from the data source, where the second source schema includes a second set of data fields for a second source data object; receiving, at the data mapping server, a third user input indicating the custom data object; and automatically mapping, by the data mapping server, one or more data fields of the second set of data fields for the second source data object to the one or more custom data fields for the custom data object based on the second source schema.

Some examples of the method, apparatuses, and non-transitory computer-readable medium described herein may further include operations, features, means, or instructions for receiving, at the data mapping server, a third indication of a third source schema different from the source schema for a third data source different from the data source, where the third source schema includes a third set of data fields for a third source data object; receiving, at the data mapping server, a fourth user input indicating a standard data object; and receiving, at the data mapping server, a fifth user input indicating a mapping for one or more data fields of the third set of data fields for the third source data object to one or more standard data fields for the standard data object.

Some examples of the method, apparatuses, and non-transitory computer-readable medium described herein may further include operations, features, means, or instructions for receiving, at the data mapping server, a sixth user input indicating creation of a custom data field for the standard data object and a mapping from a data field of the third set of data fields for the third source data object to the custom data field for the standard data object; creating, in the database system, the custom data field for the standard data object based on the sixth user input; and mapping, by the data mapping server, a set of values from the data field of the third set of data fields for the third source data object to the custom data field for the standard data object based on the sixth user input.

In some examples of the method, apparatuses, and non-transitory computer-readable medium described herein, creating the custom data object may further include operations, features, means, or instructions for receiving, at the data mapping server, a seventh user input; and modifying, by the data mapping server, a custom data field of the one or more custom data fields, a mapping of the automatic mapping, or a combination thereof based on the seventh user input.

In some examples of the method, apparatuses, and non-transitory computer-readable medium described herein, modifying the custom data field of the one or more custom data fields may include operations, features, means, or instructions for changing, by the data mapping server, a label of the custom data field, a data type of the custom data field, a property of the custom data field, or a combination thereof.

In some examples of the method, apparatuses, and non-transitory computer-readable medium described herein, receiving the indication of the source schema for the data source may include operations, features, means, or instructions for fetching the source schema from the data source.

In some examples of the method, apparatuses, and non-transitory computer-readable medium described herein, receiving the indication of the source schema for the data source may include operations, features, means, or instructions for receiving, at the data mapping server, an eighth user input indicating the source schema for the data source.

Some examples of the method, apparatuses, and non-transitory computer-readable medium described herein may further include operations, features, means, or instructions for performing data segmentation, activation, analysis, or a combination thereof based on the set of data records stored according to the custom schema.

Some examples of the method, apparatuses, and non-transitory computer-readable medium described herein may further include operations, features, means, or instructions for storing, in the database system, an indication of a connection between the custom data object and a standard data object; receiving, at the database system, a query message including a search criterion based on the custom data object and a return value associated with the standard data object; searching the database system using the search criterion and the custom data object; and retrieving, from the database system, information from the standard data object based on the return value, the connection between the custom data object and the standard data object, and the searching.

Some examples of the method, apparatuses, and non-transitory computer-readable medium described herein may further include operations, features, means, or instructions for transmitting, for display in a user interface of a user device, an indication of the automatic mapping of the one or more data fields of the set of data fields for the source data object to the one or more custom data fields for the custom data object, where the user input may be received via the user interface of the user device.

Some examples of the method, apparatuses, and non-transitory computer-readable medium described herein may further include operations, features, means, or instructions for storing, in the database system, an indication of a data stream from the data source to the database system according to a mapping from the source data object to the custom data object; importing, from the data source, an additional set of data records stored at the data source based on the data stream; and storing, in the database system, the additional set of data records according to the custom schema based on the mapping from the source data object to the custom data object.

Some examples of the method, apparatuses, and non-transitory computer-readable medium described herein may further include operations, features, means, or instructions for receiving, at the data mapping server, a ninth user input indicating a refresh schedule for the data source, where the additional set of data records is imported based on the refresh schedule for the data source.

Some examples of the method, apparatuses, and non-transitory computer-readable medium described herein may further include operations, features, means, or instructions for receiving, at the data mapping server from a user device, a tenth user input indicating the data source; identifying an authentication procedure for the data source; transmitting, to the user device, a request for authentication information for the authentication procedure for the data source; and receiving, at the data mapping server from the user device, the authentication information, where the indication of the source schema for the data source is received based on performing the authentication procedure for the data source using the received authentication information.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data mapping, comprising:
   importing a plurality of data records from a first data source and a second data source to a database system in accordance with a first source data schema and a second source data schema based on performing an authentication procedure which includes receiving authentication information for the first data source and the second data source from a user device;
   storing the plurality of data records in a data lake of the database system in accordance with a custom data schema different from the first source data schema and the second source data schema;
   creating a custom data object that includes data from the plurality of data records stored in accordance with the custom data schema, wherein creating the custom data object comprises using a natural language processing (NLP) model to map fields of two or more data records associated with at least one standard data object and at least one hybrid data object from different data sources to fields of the custom data object based on determining that the two or more data records correspond to a same user;
   receiving, from a cloud client, a query that includes a search criterion associated with the custom data object; and
   querying the data lake of the database system to retrieve data from the at least one standard data object and the at least one hybrid data object that are mapped to the custom data object based at least in part on the search criterion associated with the custom data object.

2. The method of claim 1, further comprising:
   receiving, at the database system, a second user input indicating a mapping between a data field from the first data source and a custom data field of the custom data object; and
   updating, in the database system, the plurality of data records stored according to the custom data schema based at least in part on the second user input, wherein updating the plurality of data records comprises mapping a plurality of values from the plurality of data records to the custom data field in accordance with the mapping.

3. The method of claim 1, further comprising:
   receiving, at the database system, an indication of the second source data schema for the second data source;
   receiving, at the database system, a second user input indicating the custom data object; and
   mapping, by the database system, data fields from the second data source to one or more custom data fields of the custom data object based at least in part on the second source data schema.

4. The method of claim 1, further comprising:
   receiving, at the database system, an indication of a third source data schema that is different from the first source data schema and the second source data schema;
   receiving, at the database system, a second user input indicating a standard data object; and
   receiving, at the database system, a third user input indicating a mapping between one or more data fields of the third source data schema and one or more standard data fields of the standard data object.

5. The method of claim 1, wherein creating the custom data object comprises:
   receiving, at the database system, a second user input; and
   modifying, by the database system, a custom data field of the custom data object based at least in part on the second user input.

6. The method of claim 1, further comprising:
   fetching the first source data schema from the first data source.

7. The method of claim 1, further comprising:
   receiving, at the database system, a second user input indicating the second source data schema for the second data source.

8. The method of claim 1, further comprising:
   performing data segmentation, activation, analysis, or a combination thereof on the plurality of data records based at least in part on storing the plurality of data records according to the custom data schema.

9. The method of claim 1, further comprising:
   querying the plurality of data records using the search criterion;
   identifying a connection between the custom data object and a standard data object based at least in part on querying the plurality of data records;
   retrieving, based at least in part on the connection, a data field for the standard data object; and
   transmitting, in accordance with the query, an indication of the data field.

10. The method of claim 1, further comprising:
    transmitting, for display at a user interface, an indication of a mapping for the custom data object.

11. The method of claim 1, further comprising:
    storing, in the database system, a data stream from the first data source;
    importing, from the first data source, a second plurality of data records associated with the data stream; and
    storing, in the database system, the second plurality of data records according to the custom data schema.

12. The method of claim 1, further comprising:
    receiving, at the database system and from a user device, a second user input indicating the second data source;
    identifying the authentication procedure for the second data source;

transmitting, to the user device, a request for the authentication information associated with the authentication procedure for the second data source; and receiving, at the database system and from the user device, the authentication information, wherein an indication of the second source data schema for the second data source is received after performing the authentication procedure for the second data source using the authentication information.

13. The method of claim 1, further comprising:
compressing and encrypting the plurality of data records to reduce system load and increase system security, wherein the plurality of compressed, encrypted data records are stored in the data lake associated with the database system.

14. The method of claim 2, wherein:
the data field is initially unmapped to the custom data field; and
the plurality of values are preserved in the database system after storing the plurality of data records at the database system.

15. The method of claim 2, wherein updating the plurality of data records is based at least in part on storing the plurality of data records according to the custom data schema.

16. The method of claim 4, further comprising:
receiving, at the database system, a fourth user input indicating a creation of a custom data field for the standard data object and a mapping from a data field of the third source data schema to the custom data field for the standard data object;
creating the custom data field for the standard data object based at least in part on the fourth user input; and
mapping, by the database system, values from the third source data schema to the custom data field for the standard data object based at least in part on the fourth user input.

17. The method of claim 5, wherein modifying the custom data field of the custom data object comprises:
changing, by the database system, a label of the custom data field, a data type of the custom data field, a property of the custom data field, or a combination thereof.

18. The method of claim 11, further comprising:
receiving, at the database system, a second user input indicating a refresh schedule for the first data source, wherein the second plurality of data records are imported in accordance with the refresh schedule.

19. An apparatus for data mapping, comprising:
a processor;
memory coupled with the processor; and
instructions stored in the memory and executable by the processor to cause the apparatus to:
import a plurality of data records from a first data source and a second data source to a database system in accordance with a first source data schema and a second source data schema based on performing an authentication procedure which includes receiving authentication information for the first data source and the second data source from a user device;
store the plurality of data records in a data lake of the database system in accordance with a custom data schema different from the first source data schema and the second source data schema;
create a custom data object that includes data from the plurality of data records stored in accordance with the custom data schema, wherein creating the custom data object comprises using a natural language processing (NLP) model to map fields of two or more data records associated with at least one standard data object and at least one hybrid data object from different data sources to fields of the custom data object based on determining that the two or more data records correspond to a same user;
receive, from a cloud client, a query that includes a search criterion associated with the custom data object; and
query the data lake of the database system to retrieve data from the at least one standard data object and the at least one hybrid data object that are mapped to the custom data object based at least in part on the search criterion associated with the custom data object.

20. A non-transitory computer-readable medium storing code for data mapping, the code comprising instructions executable by a processor to:
import a plurality of data records from a first data source and a second data source to a database system in accordance with a first source data schema and a second source data schema based on performing an authentication procedure which includes receiving authentication information for the first data source and the second data source from a user device;
store the plurality of data records in a data lake of the database system in accordance with a custom data schema different from the first source data schema and the second source data schema;
create a custom data object that includes data from the plurality of data records stored in accordance with the custom data schema, wherein creating the custom data object comprises using a natural language processing (NLP) model to map fields of two or more data records associated with at least one standard data object and at least one hybrid data object from different data sources to fields of the custom data object based on determining that the two or more data records correspond to a same user;
receive, from a cloud client, a query that includes a search criterion associated with the custom data object; and
query the data lake of the database system to retrieve data from the at least one standard data object and the at least one hybrid data object that are mapped to the custom data object based at least in part on the search criterion associated with the custom data object.

* * * * *